United States Patent
Sheikh et al.

(10) Patent No.: US 7,328,690 B2
(45) Date of Patent: Feb. 12, 2008

(54) APPARATUS AND METHOD FOR ACCURATE DETECTION OF LOCOMOTIVE FUEL INJECTION PUMP SOLENOID CLOSURE

(75) Inventors: Ahmed Esa Sheikh, Erie, PA (US);
Suresh Baddam Reddy, Erie, PA (US);
Samraj Jabez Dhinagar, Balgalore, PA (US); Bo Nilson Almstedt, Åmål (SE);
Andreas Peterson, Åmål (SE);
Thomas Dovheim, Säffle (SE);
Lennart Rudander, Säffle (SE)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 10/892,852

(22) Filed: Jul. 16, 2004

(65) Prior Publication Data
US 2005/0066940 A1    Mar. 31, 2005

Related U.S. Application Data (60) Provisional application No. 60/506,555, filed on Sep. 26, 2003.

(51) Int. Cl.
*F02M 59/36* (2006.01)
(52) U.S. Cl. .................. 123/458; 123/494; 327/589
(58) Field of Classification Search ............. 123/501, 123/500, 506, 494, 458; 327/589, 427, 537, 327/325, 375, 390; 73/119 A, 116
See application file for complete search history.

(56) References Cited

U.S. PATENT DOCUMENTS

| | | | |
|---|---|---|---|
| 3,731,209 A * | 5/1973 | Satterfield | 327/58 |
| 4,080,552 A | 3/1978 | Brown | |
| 4,462,368 A * | 7/1984 | Funada | 123/446 |
| 4,757,795 A * | 7/1988 | Kelly | 123/506 |
| 4,788,960 A * | 12/1988 | Oshizawa | 123/506 |
| 5,058,553 A * | 10/1991 | Kondo et al. | 123/456 |
| 5,277,163 A * | 1/1994 | Ohishi | 123/167 |
| 5,678,521 A * | 10/1997 | Thompson et al. | 123/447 |
| 5,722,373 A * | 3/1998 | Paul et al. | 123/446 |
| 5,752,482 A * | 5/1998 | Roettgen et al. | 123/322 |
| 5,883,547 A * | 3/1999 | Diazzi et al. | 327/589 |
| 6,237,572 B1 * | 5/2001 | Carrell et al. | 123/501 |
| 6,508,235 B2 * | 1/2003 | Fabre | 123/520 |

FOREIGN PATENT DOCUMENTS

| | | |
|---|---|---|
| EP | 0243871 | 11/1987 |
| JP | 11336634 | 12/1999 |
| JP | 2002/339830 | 11/2002 |
| WO | WO 03/007317 A1 | 1/2003 |

* cited by examiner

*Primary Examiner*—Carl S. Miller
(74) *Attorney, Agent, or Firm*—Senniger Powers (57) ABSTRACT

The invention relates to a system and method for detecting a closing of a solenoid. The system includes a capacitive charge circuit electrically coupled to the solenoid. The capacitive charge circuit conditions the current flow through the solenoid to increase the current in response to the closing of the solenoid. The invention also relates to a system and method that includes detecting a current through the solenoid and determining a current slope characteristic. The current slope characteristic is a function of the current and time. The method also includes conditioning an electrical characteristic of the solenoid such that the conditioning is in response to a current slope parameter. The current slope parameter defines a change in the current after removal of an electrical charge to the solenoid.

13 Claims, 8 Drawing Sheets

APPARATUS AND METHOD FOR ACCURATE DETECTION OF LOCOMOTIVE FUEL INJECTION PUMP SOLENOID CLOSURE

CROSS REFERENCE TO RELATED APPLICATIONS

The invention of the present application claims priority based on U.S. Provisional Application Ser. No. 60/506,555 filed on Sep. 26, 2003.

FIELD OF THE INVENTION

The invention relates generally to control of a fuel injection system equipped with a fuel injection solenoid. In particular, the invention relates to an apparatus and method for controlling a fuel pump solenoid by detecting a closure of the solenoid.

BACKGROUND OF THE INVENTION

In engine systems, the accurate detection of fuel pump solenoid closure or closing point detection for each of the cylinders of the engine is desirable to provide accurate timing of injection of fuel and control of combustion, emissions, smooth regulation of engine speed, and fuel efficiency. Prior art system and methods for detecting fuel injection solenoid closure involve detecting the change of slope of the solenoid current within a window, as the current is reduced from peak pull-in current, to hold current. However, prior art systems are susceptible to variations due to cable lengths between engine control unit and the engine cylinder solenoids, aging, ambient conditions, fuel pumps, and engine speed. Moreover, the location and the characteristic signature of such a detection scheme may vary as a function of pump, impedance of electronics/cabling/solenoid, power supply voltage, engine speed, hydraulic fuel pressure, cam location, aging, and ambient conditions. These variations reduce the reliability and accuracy of conventional methods of closing point detection.

Detecting solenoid closure in a in a fuel injection system is desirable for determining any required compensation in timing of fuel injection. The timing of fuel injection is a critical variable to control in order to achieve operational goals such as combustion quality, fuel efficiency and reduced emissions. Any inaccuracies in closing point detection impact these important goals. An appropriate algorithm with consistent detection and accuracy helps achieve these goals.

Therefore, there is a need for an improved method of detection of closing point and minimizing the susceptibility of closing point detection due to variations that change the characteristics of current waveform. The present invention provides an improved method of closing point detection by regulating the slope from peak current to the time when the closing point is detected.

SUMMARY OF THE INVENTION

These and other problems are solved by one of the following features: (i) the signature characteristic of the current being controlled by regulating current slope in response to capacitive charge circuit; (ii) the closing point detection time window used for closing point detection being a function of power supply voltage, and (iii) the time window being adaptively varied to account for drifts, pump and solenoid variations, ambient condition changes, and aging.

In one aspect, the invention relates to a system for detecting a closing of a solenoid. The system includes a capacity charge circuit electrically coupled to the solenoid. The capacity charge circuit conditions the current flow through the solenoid to increase the current in response to the closing of the solenoid.

In one aspect, the invention relates to a system for detecting a closing of a solenoid. The system includes a capacitive charge circuit electrically coupled to the solenoid. The capacitive charge circuit conditions the current flow through the solenoid to increase the current in response to the closing of the solenoid.

In another aspect, the invention relates to a system for detecting a closing point of a fuel injection pump solenoid associated with a cylinder of a locomotive diesel engine. The system includes a solenoid driver circuit for providing a current and a voltage to a winding of the solenoid. The solenoid has a low side driver and a high side driver. The system also includes a sensor for detecting the current through the winding of the solenoid. A capacitive charge circuit is included for modifying the voltage and the current as a function of a capacitive charge value. The system also includes a processor configured with computer instructions for determining the capacitive charge value. The processor is electrically coupled to the capacitive charge circuit and provides the capacitive charge to the capacitive charge circuit. The system also includes a detector for detecting a change in a slope of the current as a function of time. The change of slope changes from a decrease in current over time to an increase in current over time in response to the closing of the solenoid.

In yet another aspect, the invention relates to a system for detecting a closing of a solenoid that includes a capacity charge circuit electrically coupled to the solenoid. The capacitive charge circuit conditions a current through the solenoid in response to a current slope parameter. The current slope parameter defines a change in the current after removal of an electrical charge to the solenoid.

In yet another aspect, the invention relates to a system for detecting a closing of a solenoid that includes a capacitive charge circuit electrically coupled to the solenoid. The capacitive charge circuit conditions a current through the solenoid in response to a current slope parameter. The current slope parameter defines a change in the current after removal of an electrical charge to the solenoid.

In yet another aspect, the invention relates to a system for detecting a closing of a solenoid. The system includes a current detector electrically coupled to the solenoid for detecting a current through the solenoid. A processor determines a current slope characteristic wherein the current slope characteristic is a function of the detected current and time. The system also includes a capacity charge circuit electrically coupled to the solenoid for conditioning the current through the solenoid. The conditioning provides a change in the current slope characteristic after removal of an electrical charge responsive to a current slope parameter.

In yet another aspect, the invention relates to a system for detecting a closing of a solenoid. The system includes a current detector electrically coupled to the solenoid for detecting a current through the solenoid. A processor determines a current slope characteristic wherein the current slope characteristic is a function of the detected current and time. The system also includes a capacitive charge circuit electrically coupled to the solenoid for conditioning the current through the solenoid. The conditioning provides a change in the current slope characteristic after removal of an electrical charge responsive to a current slope parameter.

In yet another aspect, the invention relates to a method for detecting a closing of a solenoid that includes determining a closing point window for detection of the closing of the solenoid as a function of solenoid power supply voltage.

In another aspect, the invention relates to a system for detecting a closing point of a fuel injection pump solenoid associated with a cylinder of a locomotive diesel engine. The system includes a solenoid driver circuit providing a current and a voltage to a winding of the solenoid. A sensor detects the current through the winding of the solenoid. The system also includes a processor that is configured with computer instructions that specify a closing point window as a function of solenoid power supply voltage. The processor also detects a change in the current as a function of time during the closing point window.

In yet another aspect, the invention relates to a method for operating a fuel injection system of a locomotive diesel engine that includes specifying a closing point detection value for a cylinder of the diesel engine in response to a failure to detect the closing of the solenoid. When a speed and a timing of the diesel engine at the time of specifying is comparable to a speed and timing of the diesel engine of the previously detected closing point detection values, the specified closing point detection value is a function of an exponentially weighted average of previously detected closing point detection values. When the speed and the timing of the diesel engine at the time of the specifying varies from a speed and a timing of the diesel engine associated with a previously detected closing of the solenoid, the specified closing point detection value is a function of an average of generally contemporaneously determined closing point values.

In another aspect, the invention relates to a system for operating a fuel injection system of a locomotive diesel engine. The system includes a solenoid driver circuit that provides a current and a voltage to a winding of the solenoid. A sensor detects the current through the winding of the solenoid. A memory stores the detected closing point detection values and a speed and a timing associated with the detected closing point values. The system also includes a processor that is configured with computer instructions. The computer instructions specify a closing point detection value for a cylinder of the diesel engine in response to a failure to detect the closing of the solenoid. The specified closing point detection value is a function of an exponentially weighted average of previously detected closing point detection values stored in the memory when a speed and a timing of the diesel engine at the time of specifying is comparable to a speed and a timing of the diesel engine of the previously detected closing point detection values. The specified closing point detection value is a function of an average of generally contemporaneously determined closing point values as stored in the memory when the speed and the timing of the diesel engine at the time of the specifying varies a predetermined amount from a speed and a timing of the diesel engine associated with a previously detected closing of the solenoid.

Other aspects and features of the present invention will be in part apparent and in part pointed out hereinafter when the following description is read in conjunction with the accompanying drawings.

BRIEF DESCRIPTION OF THE DRAWINGS

Corresponding reference characters and designations generally indicate corresponding parts throughout the drawings.

DETAILED DESCRIPTION

The present invention proposes a method and system for controlling a fuel injection system equipped with a fuel injection solenoid. More specifically, the invention provides a method and system for reducing fuel injection timing errors associated with a fuel pump solenoid by detecting a change in the closing point timing of the solenoid over a period of time. The time between the application of a voltage to the solenoid and the instant at which the solenoid actually starts moving is critical and is the Closing Point Detection (CPD) timing.

Figure 1:
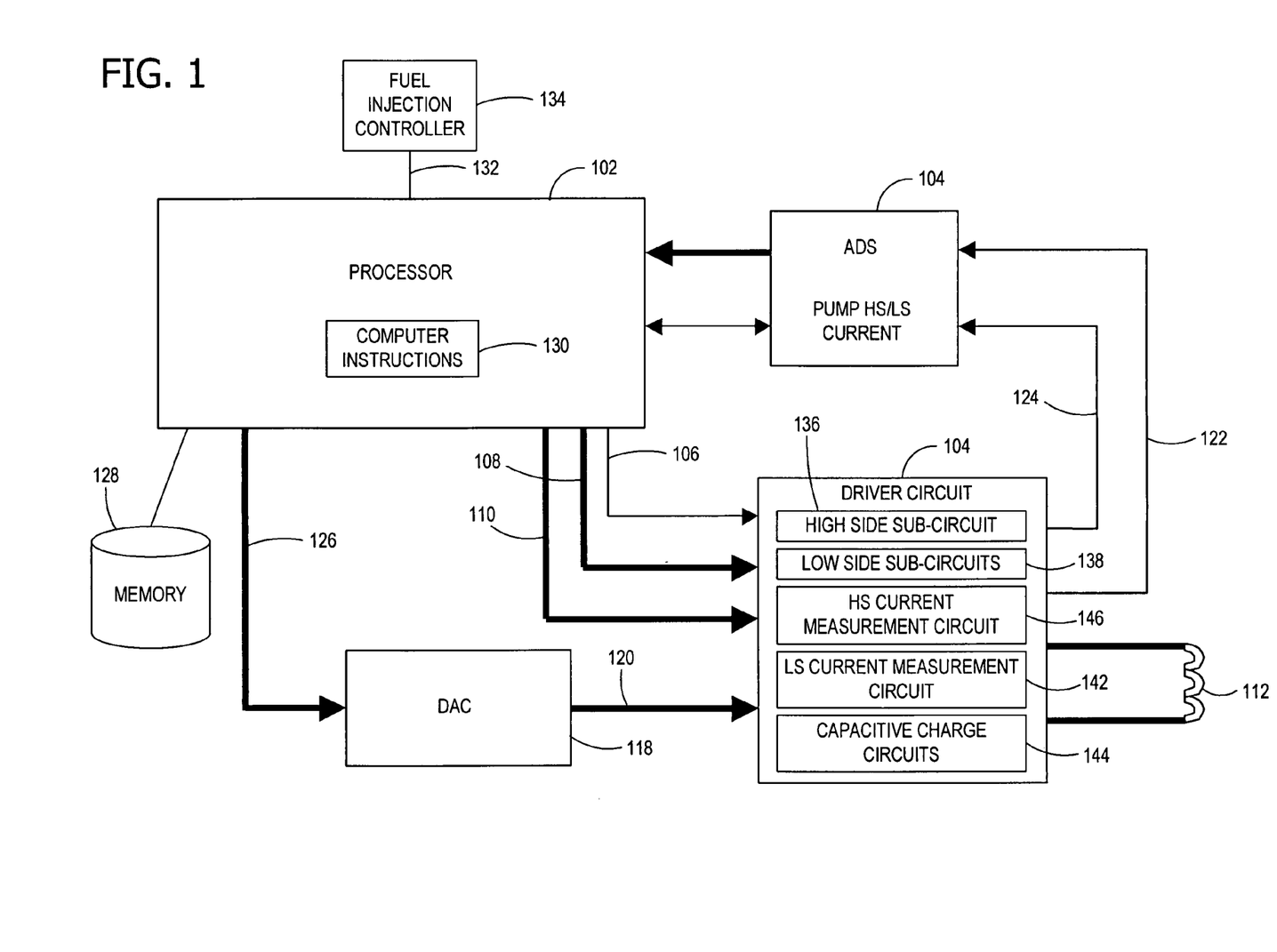
FIG. 1 is a diagram illustrating components of one embodiment a solenoid control system.

Referring to FIG. 1, one embodiment of a solenoid control system 100 according to one aspect of the invention includes one or more processors 102 executing computer-executable instructions 130. Processor 102 is electrically coupled to memory 128. Memory 128 may store computer executable instructions 130 and may store one or more determinations made by the processor. Processor 102 is electrically coupled to a solenoid driver circuitry. Solenoid driver circuit 104 provides energizing power (voltage and current) to a fuel injection pump solenoid 112. Solenoid driver circuit 104 includes sub-circuits including one or more of a high side driver circuit 136, a low side driver circuit 138, a high side current measurement circuit 140, a low side current measurement circuit 142, and a capacitive charge circuit 144.

Processor 102 provides control signals to solenoid driver circuit 104 including a high side command signal 106 indicating an on/off for the high side powering of the solenoid, a low side command signal 108 indicating an on/off for the low side powering of the solenoid, and a capacitive charge circuit command signal 110 indicating and on/off for the capacitive charge circuit. Processor 102 is also electrically coupled to a linear voltage digital to analog converter (DAC) 118. Processor 102 provides a linear voltage signal 126 to the linear voltage DAC 118 that in turn provides the analog charge value signal 120 for each channel or for each cylinder to solenoid driver circuit 104.

Solenoid driver circuit 104 provides the capacitive charge to solenoid 112 in response to the analog charge value signal 120. The high side current measurement circuit of the solenoid driver circuit 104 provides a high side current measurement output 122 to an analog to digital converter 116. The low side current measurement circuit of the solenoid driver circuit 104 provides a low side current measurement output 124 to the analog to digital converter 116. The analog to digital converter 116 provides the measured data to processor 102. Processor 102 and analog to digital converter 116 coordinate the determination of the channel or cylinder associated with the measurements and determinations.

Figure 2:
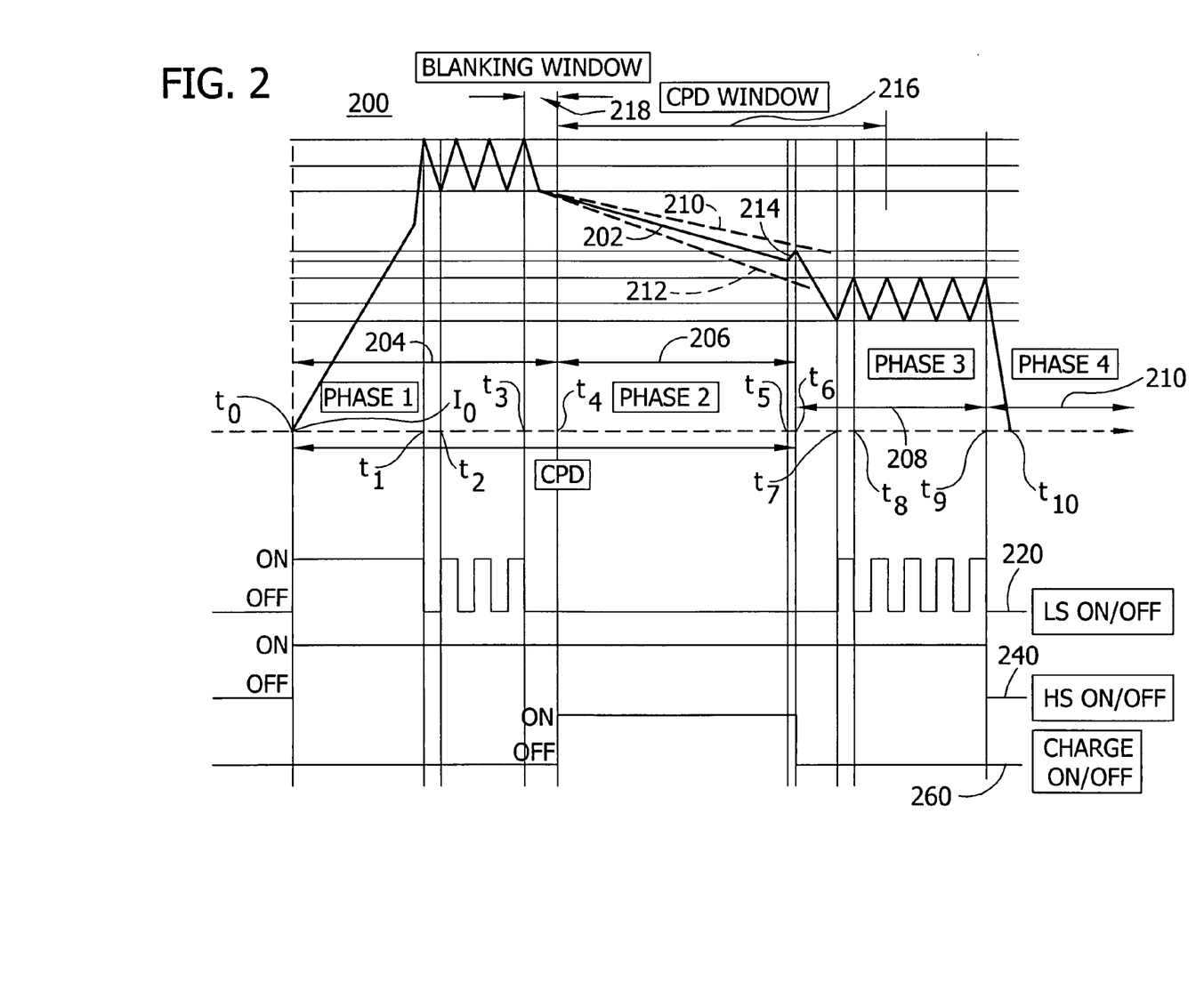
FIG. 2 is a chart illustrating solenoid current as a function of time and timing lines associated with the electrical powering of the solenoid affecting the solenoid current.

Referring to FIG. 2, graph 200 illustrates solenoid current 202 as a function of current value (y-axis) and time (x-axis). Current 202 is a function of the voltage applied to solenoid 112 by solenoid driver circuit 104. Associated in time with solenoid current graph 220 are control signal timing diagrams 220, 240 and 260, for command signals. Signal timing diagram or graph 220 illustrates the timing for on (high) and off (low) digital signals for the low side electrical driver or powering circuit for solenoid 112. Signal timing diagram 240 illustrates the on and off signal positions as a function of time for the high side control signal for high side electric powering circuit for solenoid 112. Signal timing diagram 260 illustrates the on and off signal for the capacitive charge circuit for solenoid 112. As illustrated, each of graphs in FIG. 2, graphs 200, 220, 240, and 260, have common timing wherein a point in time for each is the same point in time for each of the other timing graphs, for example time $t_1$. This group of graphs illustrates the interrelationship between the three control signals 106, 108, and 110 and the current 202 through the solenoid as a function of time.

At time $t_0$, current 202 is $I_0$ that may in some embodiment be an un-energized state of zero current. In other embodiments, current $I_0$ may be an amount greater than zero. At time $t_0$, processor 102 initiates the solenoid activation sequence which includes generating an on condition in both high side control signal 106 and low side control signal 108 as indicated in timing diagrams 240 and 220, respectively. In response, solenoid driver circuit 104 applied high side powering and low side powering to solenoid 112 and the current increases from $I_0$ at time $t_0$ to $I_1$ at time $t_0$. At this point, solenoid driver circuit 104 measures the currents in solenoid 112 and provides these measurements to ADC 116 that in turn provides them to processor 102. Processor 102 compares the current 202 to a predetermined phase 1 maximum current level and when current 202 reaches the predetermined phase 1 maximum current level provides an off low side driver signal 108 to solenoid driver circuit 104. Phase 1 is shown as 204 that is the time interval between $t_0$ and $t_4$. Upon turning off the low side powering, current 202 decreases from $I_1$ to $I_2$ at time $t_2$. Processor 102 provides an on/off control signal 108 to the low side driver such that current 202 is maintained between a maximum value of $I_1$ and a minimum value of $I_2$, averaging at a predetermined pull-in current value of $I_3$.

Processor continues to pulse the low side driver for a defined period of time and then at time $t_3$ turns off the low side driver as indicated by timing signal 220 at time $t_3$. Upon turning off the pulsing of the low side driver, current 202 through solenoid 112 decreasing as the stored energy dissipates to ground. Processor 102 initiates an on control signal 110 for the capacitive charge circuit at time $t_4$. Time $t_4$ being a predefined period of time following $t_3$, which is referred to as a blanking window 218. Current 202 continues to decrease as a function of the capacitive charge circuit and other electrical characteristics of solenoid 112 and solenoid driver circuit 104. This decrease is illustrated as the decrease in current 202 at time $t_4$ of $I_2$ to the value of $I_4$ at time $t_5$. The slope of the current line as a function of time from $I_2$ at $t_4$ to $I_4$ at $t_5$ being a function of the capacitive charge circuit and the provided analog charge value 120. Processor 102 determines the desired capacitive charge value 120 to regulate, control, or condition solenoid current 202 during this phase 2 (indicated by 206). Processor 102 regulates the slope of current 202 as a function of time between $t_4$ and $t_5$ such that the slope is within an upper bound 210 and a lower bound 212.

In graph 200, time $t_5$ indicates the point in time when the core or actuator of solenoid 112 closes. Upon closing, current 202 increases due to the change in the electrical characteristics of solenoid 112 as a function of solenoid driver circuit 104 and specifically as a function of the capacitive charge circuit. Processor 102 continues to measure current 202 based on measurements of solenoid driver circuit 104 and feedback on the high side current 122 and low side current 124 to ADC 116. When processor 102 detects an increase of current 202 from a previous value (shown as $I_4$) to a value $I_5$, the processor determines that solenoid 112 has closed. The determination of the closing of solenoid 112 may, in one embodiment, be based on a change of the current as a function of time from a negative slope to a positive slope as indicated by the slope of line 220 from $I_2$ at $t_4$ to $I_4$ at $t_5$ and the slope of line 214 from $I_4$ at $t_5$ to $I_5$ at $t_6$. As illustrated, the processor requires a time period $t_6$-$t_5$ to determine the change in current 202 over time is indicative of a closing of solenoid 112.

Upon detection of the closing of solenoid 112, processor 102 provides an off signal via the capacitive charge control signal 110 to the solenoid driver circuit 104. The solenoid driver circuit 104 removes powering of the capacitive charge circuit as indicated at time $t_6$ on capacitive charge signal 260. Processor 102 provides time $t_6$ or the determined time $t_5$ in fuel timing signal 132 to a fuel injection controller 134. Upon removal of the capacitive charge powering of solenoid 112, current 202 decreases from current $I_5$ at time $t_6$ to current $I_6$ at time $t_7$. When processor 102 determines that current 202 has reached predetermined current level $I_6$, processor 102 initiates an on signal via the low side control signal 110 so that low side driver provides powering to solenoid 112. Processor 102 once again pulses low side driver between an on state and an off state such as to maintain current 202 at between a maximum value of $I_7$ and a minimum value of $I_6$, with an average current of $I_8$. $I_8$ is referred to as the holding current and this period of time is referred to as the current hold phase or phase 3 (208). After a predetermined period of time, processor 102 terminates the pulsing of the low side driver powering and the high side powering as indicated at time $t_9$ as shown in graphs 220 and 240. In response to the termination of both the high side powering and the low side powering, current 202 decreases from value $I_7$ at time $t_9$ to $I_0$ at time $t_{10}$. This is referred to as phase 4 210.

When solenoid 112 is closed, fuel is provided by the fuel injection system to the associated cylinder of the engine. This fuel-passing period begins with the actual opening of solenoid 112 and ends when the solenoid opens (not shown) which is some point in time after $t_9$.

In operation, one aspect of the invention is a solenoid closing point detection (CPD) apparatus and method wherein CPD is time or degrees from the time of solenoid actuation to the time when solenoid 112 is closed. The solenoid closure results in a characteristic slope change in the current 202. The computer instructions 130 of the processor 102 determines when and how to condition the current slope change. The accuracy of the detection can be validated using a measurement system for solenoid movement and comparing it to the value computed in software.

As discussed above, solenoid current 202 has four phases as a function of time. Phase 1 (204) is the pull-in current phase. At the beginning of this phase, the high side driver is turned on and kept on until the beginning of phase 4 (injection end). During phase 1 (204), the low side driver provides low side powering until a specified pull-in current level is attained $I_1$. After this, the pull-in current is regulated by pulsing the low side driver to average current value of $I_3$. The solenoid current reaches peak current in a specified time $t_1$ that may be 850 microseconds (μsec). The initial current slope during pull in phase can vary as a function of cable length, solenoid, and power supply voltage. The pull-in phase overcomes the damping and/or friction of the stationary solenoid 112. At the end of pull-in phase, low side driver is turned off.

Phase 2 (206) is the closing point detection phase during which a capacitive charge circuitry is enabled thereby providing capacitive charging powering. The window between the time low side driver is turned off $t_3$, and time $t_4$ when capacitive charge circuitry is enabled is called blanking window 218. The capacitive charge value 120 used for the charge circuitry is based on feedback calculation from previous firing of solenoid 112. The closing point of solenoid 112 is detected when the decaying current slope goes from a steady negative to a positive value, as long as this occurs within a specified "CPD window." The CPD window may be restricted to a predetermined period of time such as 600-700 μsec to avoid saturation of solenoid, current 202 dipping to or below the hold current minimum $I_6$ during this phase. At the instant the closing of solenoid 112 is detected or when the CPD window or predefined time period expires, the capacitive charge circuitry is turned off and phase 2 ends when the current reaches the minimum hold current level $I_6$. As a result of solenoid closure, pressure increases in high-pressure fuel line causing a fuel injector needle to lift.

At the end of pull-in current phase, the low side solenoid driver is turned off, and then the current starts decaying down, at a rate dictated by impedance of the circuit (this varies as a function of solenoid, cable length, ambient conditions, power supply voltage). The capacitive charge circuit is enabled by a charge on/off digital signal provided by the microcontroller for each channel that can reduce/increase the slope at which current decays during the CPD phase. The amount the slope is changed for a particular solenoid depends on the analog charge value provided by the microcontroller through a linear voltage digital to analog converter. Without this feature, it is possible that the decay is so rapid where the hold current is reached before solenoid closure occurred. The capacitive charge circuit is controlled by processor 102 such that the slope of current 202 as a function of time can be varied within reasonable bounds 210 and 212. In the "linear" voltage mode, the transistor is "partially" open, thus resulting in slowing of the solenoid driver turn off. Processor 102 executes instructions 130 that provide a closed loop algorithm to manipulate the capacitive charge circuit to regulate the current slope to a specific value, with dead zone on slope error, and saturation on charge value. The slope estimation from the current measurement is done by various methods for differentiation.

Phase 3 (208) is the current hold phase. During phase 3, solenoid 112 is held in the closed position by holding current 202 at a specified hold current level averaging $I_8$. Current 202 is held at the hold current level $I_8$ by turning low side driver on and off. During phase 3 while solenoid 112 is held in the closed position, fuel is delivered to the cylinder.

Phase 4(210) is end of injection phase. During phase 4(210), current 202 in solenoid 112 decreases from $I_7$ to $I_0$ or to zero causing solenoid 112 to return to the open position. Low side and high side drivers are turned off to initiate the beginning of phase 4.

Figure 3:
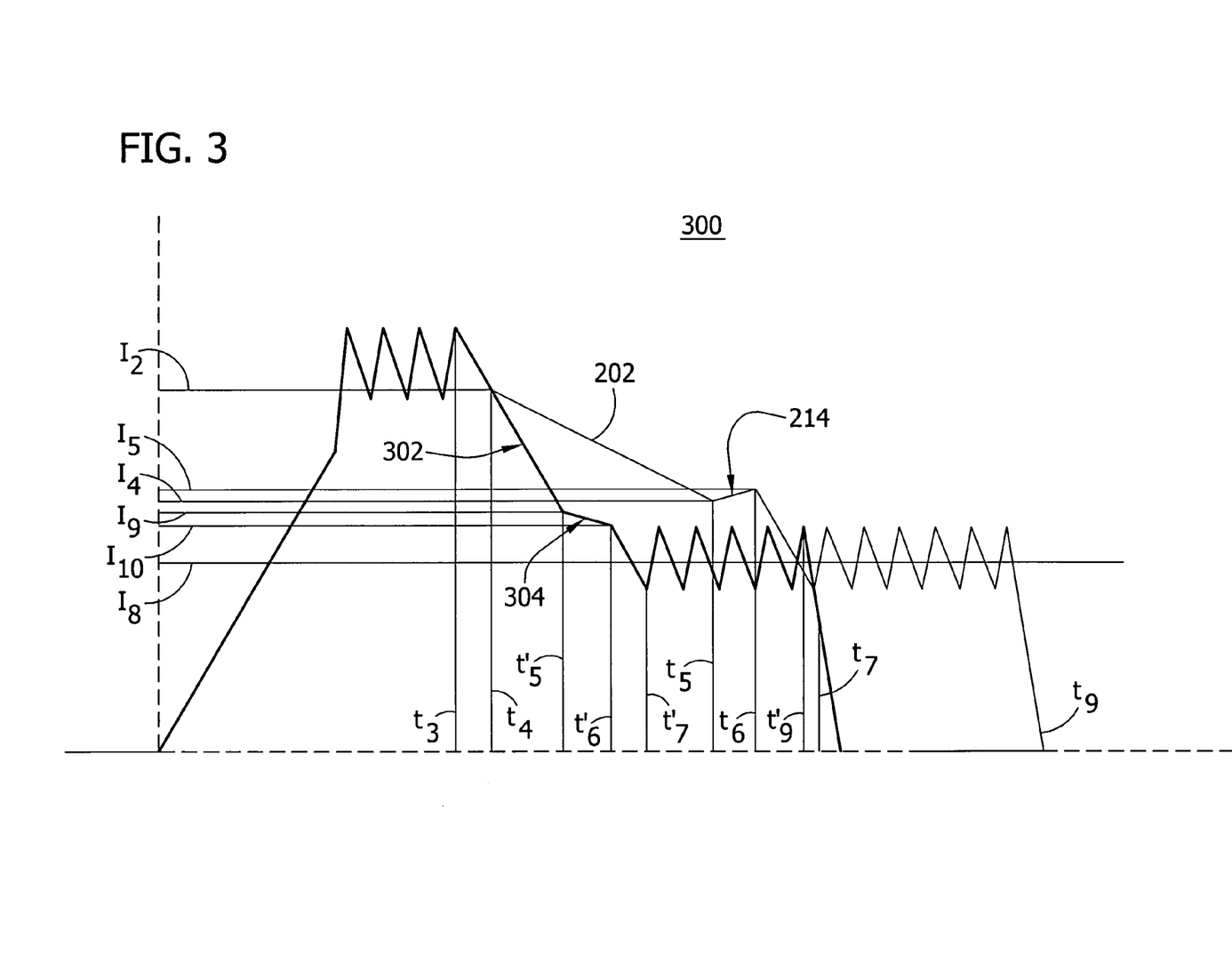
FIG. 3 is a chart illustrating solenoid current as a function of time comparing one embodiment of the invention with a prior art.

Referring now to FIG. 3, a similar graph as shown in FIG. 2 is illustrated. However, several of the aspects of the current invention are shown in comparison to the prior art. As illustrated, after removal of the low side powering at time $t_3$, the prior art current 302 decreases from $I_2$ at time $t_4$ to $I_9$ at time $t_5'$. $t_5'$ is the point in time when solenoid actually closes. As shown, in the prior art when the solenoid closes, current 302 changes slope as indicated by 304. However the slope of 304 does provide an increase in the current and does not increase or change from a negative slope to a positive slope. As such, in prior art systems it is more difficult, costly, and takes a longer period of detection time for the system to accurately detect the change in current 302 resulting in the closing of solenoid 112.

Figure 4:
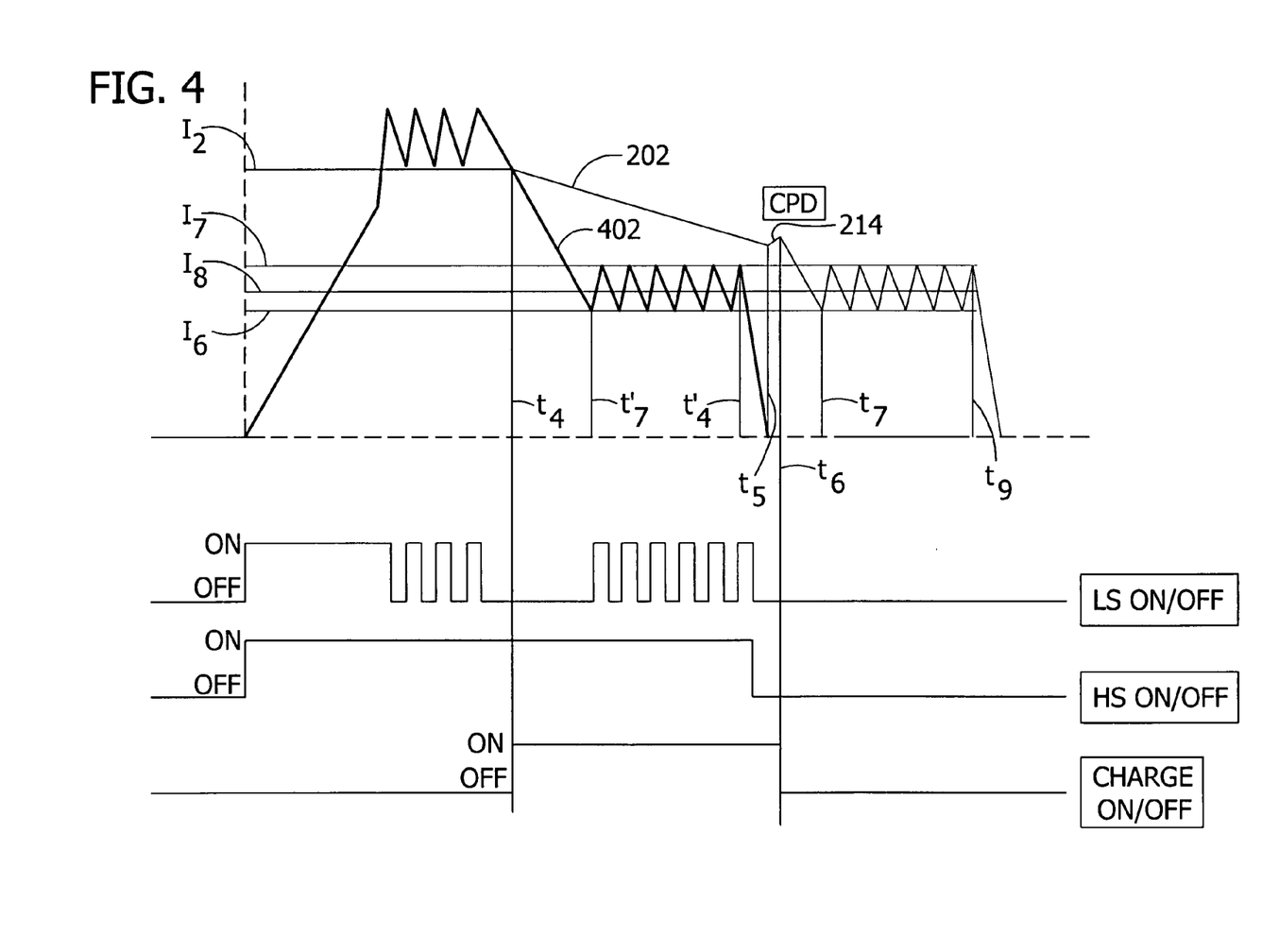
FIG. 4 is a chart illustrating solenoid current as a function of time comparing an embodiment of the invention with a prior art where the hold current is reached before closure of the solenoid.

In another comparison, FIG. 4 illustrates a problem with the prior art that is solved by one aspect of the invention. As shown, the prior art results in a current 402 that decreases from $I_2$ at $t_4$ when the low side powering is removed to the $I_6$ at time $t_7'$. Processor 102 detects the current value of $I_6$ and initiates pulsing of the low side driver between $I_7$ and $I_6$ to the current hold level of $I_8$. However, when current 402 decreases to $I_6$ such that $t_7'$ occurs before that actual closing of solenoid 112, as illustrated as $t_5$, the prior art system cannot detect a change in current 402 that results from the closing of solenoid 112. In contrast, when capacitive charge powering is turned on at time $t_4$, current 202 is conditioned by capacitive charge circuit to reduce the decrease in current 202 over time such that current level $I_6$ is not reached until after the closing of solenoid 112 at time $t_5$.

Figure 5:
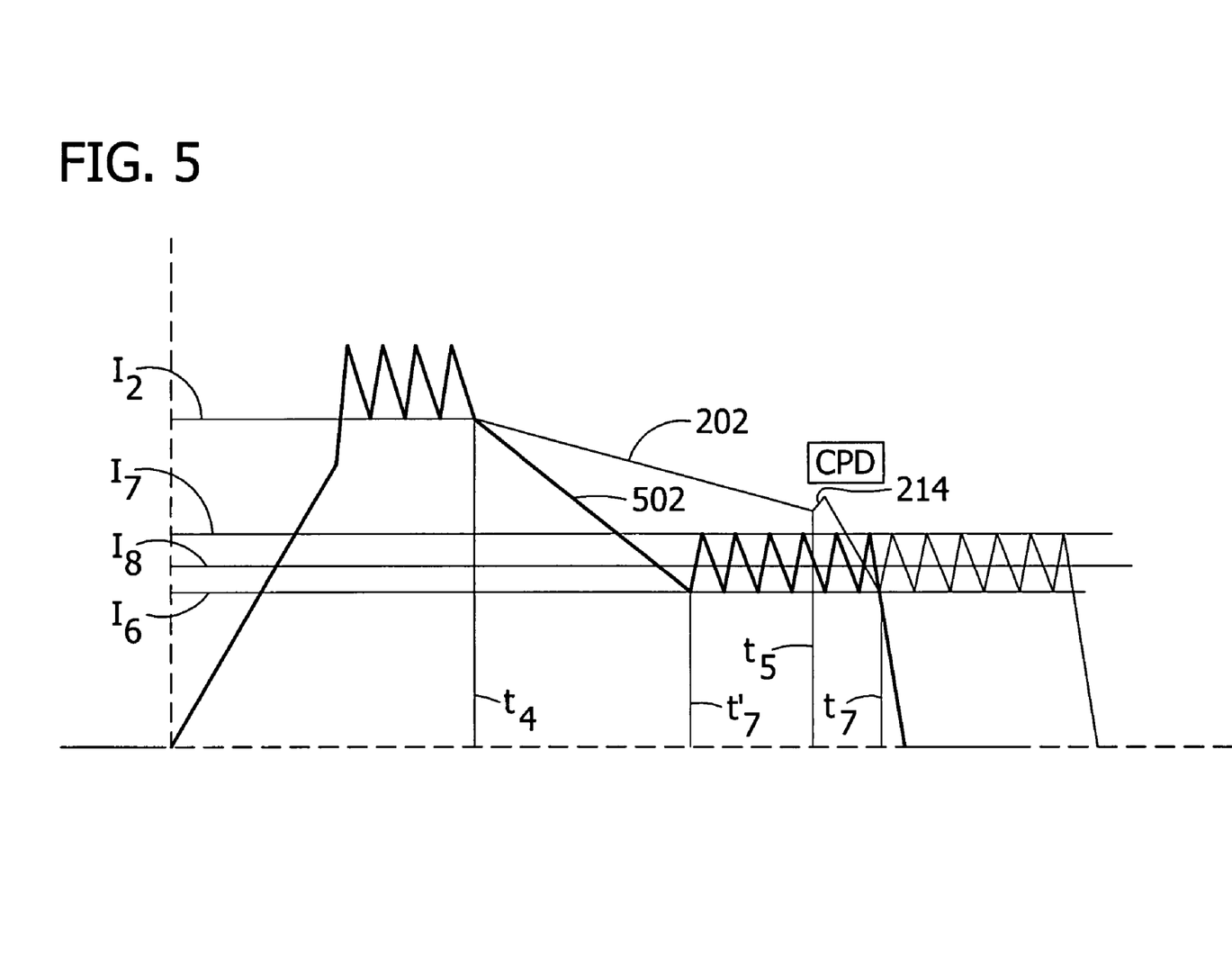
FIG. 5 is a second chart illustrating solenoid current as a function of time comparing an embodiment of the invention with a prior art where the hold current is reached before closure of the solenoid.

FIG. 5 similarly illustrates that without the charge circuit conditioning of the solenoid, current 502 decreased from $I_2$ at $t_4$ to $I_6$ at $t_7'$ prior to the closing of solenoid 112 at time $t_5$.

Figure 6:
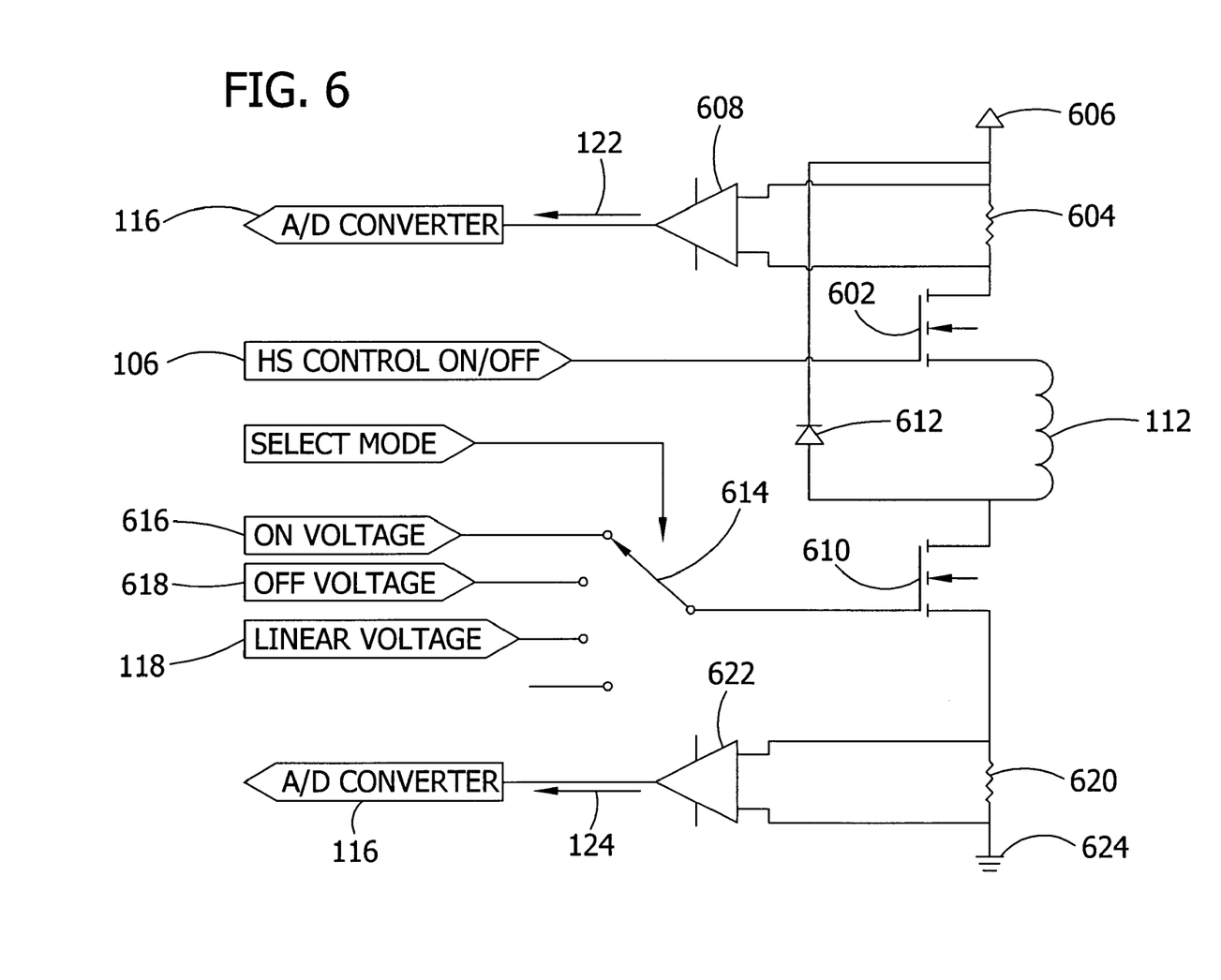
FIG. 6 is a circuit schematic for a capacitive charged circuit powering a solenoid according to one embodiment of the invention.

One embodiment of a solenoid driver circuit for CPD detection is illustrated in FIG. 6. In this circuit design, solenoid 112 is connected on the high side to high side driver 602. High side driver 602 is controlled by high side control signal 106. High side driver 602 is connected via a high side measurement resistor 604 to voltage source 606. Voltage source 606 is illustrated as a +24 volt voltage source but may be any voltage source. A high side current detector 608 is electrically coupled to both the low side and high side of high side measurement resistor 604 and provide a high side current 122 to analog to digital converter 116. The low side of solenoid 112 is electrically coupled to a free wheel diode 612 that is also electrically coupled to power source 606. The low side of solenoid 112 is also electrically coupled to a low side driver 610. Low side driver 610 is connected to a selection device 614 that specifies that mode of operation of the low side driver 610. Selection device 614 includes four selection modes: Off; Freewheeling; Linear mode; and On. The low side driver is also electrically coupled to a low side measurement resistor 620. Low side measurement resistor is connected to a ground 624. A low side current measurement device 622 is connected to both sides of low side measurement resistor 620 and provide a low side current measurement signal 124 to analog to digital converter 116.

Thus, in operation, the solenoid driver 600 as illustrated in FIG. 6 can be operated in four modes. In the Off mode, solenoid 112 is in a de-energized state. Both a high side driver 602 and a low side driver 610 are OFF and therefore no current flows in solenoid 112. The Freewheeling mode is utilized during the negative current slope of the pull-in and the hold phases. High side driver 602 is ON and low side driver 610 is OFF. Current 202 flows from the power source 606 through solenoid 112 and back to power source 606 through a freewheel diode 612. In this mode, current 202 rapidly decays to zero. The linear mode is utilized during the CPD window. During this mode, high side driver 602 is ON and low side driver 610 is partially ON or pulsed to provide a predetermined current 202 level. In this partially ON state, low side driver 610 is pulsed to maintain a predefined current. Current 202 flows from power source 606 through solenoid 112 and low side driver 610 to ground 624. Current 202 decays slowly until it is reduced to zero. The rate of decay depends on how much low side driver 610 is ON during the partially ON pulsing phase. Processor 102 defines the amount of partially ON pulsing by measuring the rate of current decay during the CPD-window. Processor 102 adjusts the level of the linear voltage via the D/A-converter 118.

Mode 4, the On Mode, is used during the positive current slope of the pull-in and the hold phase. Both high side driver 602 and low side driver 610 are ON. Current 202 flows from power source 606 through solenoid 112 and low side driver 610 to ground 624. Current 202 increases rapidly during this mode.

Figure 7:
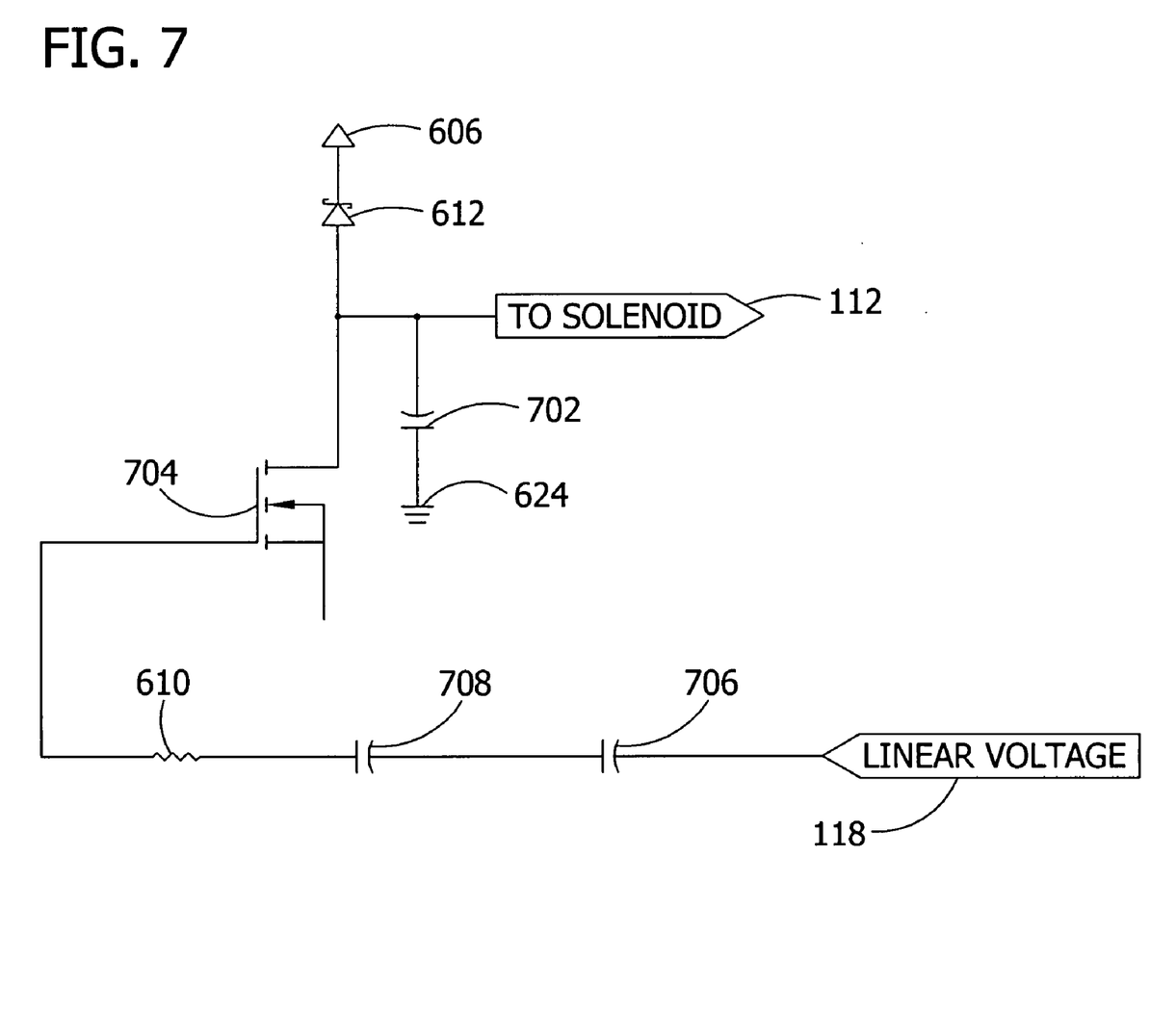
FIG. 7 is a second circuit schematic for a capacitive charged circuit powering a solenoid according to one embodiment of the invention.
Figure 8:
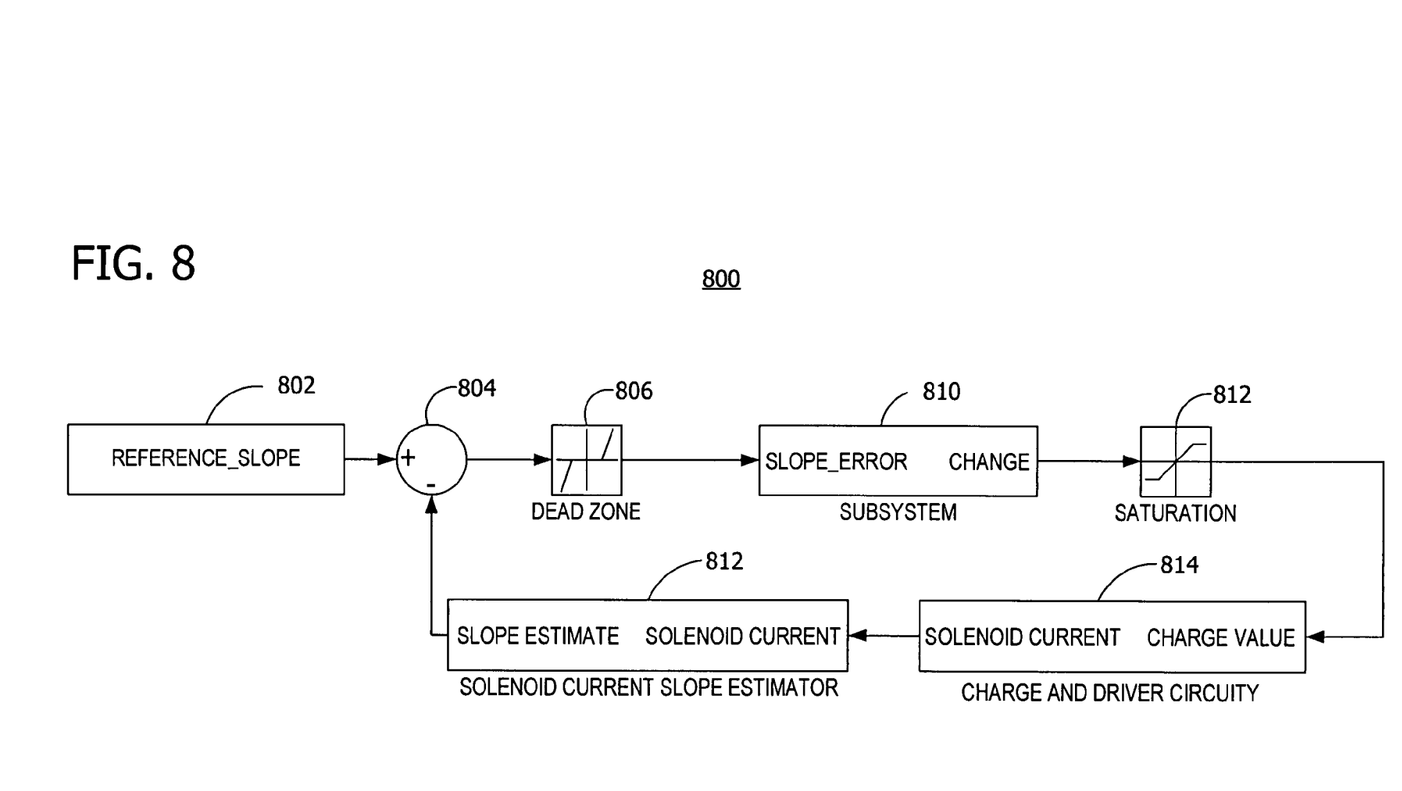
FIG. 8 is an illustration of a closed loop determination process for regulating the change in the current in a solenoid as a function of time.

Referring now to FIG. 7 is another circuit schematic for a capacity charged circuit powering a solenoid according to one embodiment of the invention. In this embodiment, solenoid 112 is connected to capacitor 702, which is connected to ground 624. Solenoid 112 is also connected to a transistor 704 and to diode 612. Diode 612 is also connected to power supply 606. Linear voltage 118 is connected to resistor 706, which is connected to capacitor 708. Capacitor 708 is connected to resistor 710, which is also connected to transistor 704.

Referring now to FIG. 7 is another circuit schematic for a capacitive charged circuit powering a solenoid according to one embodiment of the invention. In this embodiment, solenoid 112 is connected to capacitor 702, which is connected to ground 624. Solenoid 112 is also connected to a transistor 704 and to diode 612. Diode 612 is also connected to power supply 606. Linear voltage 118 is connected to resistor 706, which is connected to capacitor 708. Capacitor 708 is connected to resistor 710, which is also connected to transistor 704.

In another embodiment of the invention, processor 102 determines a closing point detection (CPD) slope signature by regulating current 202 such that the current slope changes from a negative to a positive slope value in response to a closing of solenoid 112. Processor 102 detects the solenoid closing using an algorithm that places conditions on both $di/dt$ and $d_2i/dt_2$ to be positive to determine the closing point. As such, any noise issues by dependence on $d_2i/dt_2$ alone are mitigated by the distinctive signature of CPD (as a result of regulated slope with capacitive charge circuitry), and conditioning CPD on $di/dt$ itself. This is an improvement to operating detecting the closing point as a function of $d2i/dt2>0$). Such a detection scheme is susceptible to noise on current signal, which makes it difficult for the closing to be detected from any noise. Additionally, the present invention is an improvement over simply determining a threshold as a function of $d2i/dt2$, i.e., declare CPD only if $d2i/dt2>$threshold. In this case, such a determination is difficult to reliably avoid incorrect detections and at the same time, avoid missing detections.

In another embodiment of the invention, the closing point window 216 may be adaptively determined as a function of real-time measurements and operating characteristics or parameters of the fuel injection system or engine. In this invention, CPD window start is also a function of solenoid power supply voltage and optionally, cylinder position. This multi-dimensional function accounts for known variations of CPD with engine speed, cam position and cylinder position (including effect of solenoid cable lengths to various cylinders and bank). This function is optimized by performing a design of experiments on locomotives with variations of speed and timing for various cylinders. It is expected that other variations such as pump-to-pump and locomotive-to-locomotive still keep CPD within the CPD window. This invention recommends a process for testing with these variations and ensuring that CPD is detected within the CPD window. Beyond these, this invention employs an optional scheme for adaptively varying the CPD window, to ensure more reliable CPD. In this embodiment, the CPD window is calibrated for each locomotive cylinder periodically, either in real time during operation, or at scheduled service intervals. In one embodiment, a CPD window function is initialized per a default function of rpm, timing, solenoid voltage and other known variations. CPD statistics such as a mean and a standard deviation are collected as a function of rpm, timing, etc., for each cylinder, during normal locomotive operation, or per a special test during manufacturing or maintenance service. The CPD window function for each cylinder is adjusted within constraints, such that CPD statistics fall within the CPD window, preferably in the center. The newly computed CPD window function is used for CPD window determination. The CPD window is recalibrated from time to time, to account for aging, and locomotive component changes.

This is an improvement over prior art system where the closing point detection window 216 start time, relative to the start of solenoid activation, is a static function of engine speed and injection timing command. Such prior art restricts CPD window 216 to a value typically around 500-700 μsec based on predetermined solenoid saturation measurements.

In another aspect of the invention, a closing point detection (CPD) value from one injection cycle is used for timing compensation for the next injection cycle. Given the variation in operating conditions, variations between CPD are relatively small between two consecutive cycles, this leads to sufficiently accurate timing for emissions and fuel efficiency considerations. However, despite all the features mentioned above, CPD is not detected in certain cases, particularly, when Closing Point is not reached before end of injection. This happens for negative duration angle commands, which may be needed for lightly loaded conditions, or in response to reference speed or load changes. If such conditions persist for a while, CPD may not be detected for a while. Under these conditions where CPD is not detected, a default CPD value is needed for use in timing compensation. Typically, the last detected CPD value from previous cycles is used as default value.

In contrast to prior art system, one embodiment of the current invention determines a closing point deflection default value as a function of the operating engine speed and timing at the time of the failure of detecting the closing point. When the same speed and timing conditions exist, the CPD value is used as an exponentially weighted average of the previously detected CPD values. One such embodiment may be an exponentially weighted average of a sample size of 15 previously detected CPD values. When the conditions of speed and timing have changed significantly since last detected CPD value, a default CPD for the given cylinder is based on the most recent CPD average for the particular operating speed and timing condition.

As can now be appreciated, the systems and methods herein described provide substantial advantages over the prior art. Such advantages include improved accuracy and reliability in detecting the closing of the solenoid. Significantly, the system and method herein described may also be adapted for use with existing fuel injection systems and solenoids.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

Those skilled in the art will note that the order of execution or performance of the methods illustrated and described herein is not essential, unless otherwise specified. That is, it is contemplated that aspects or steps of the methods may be performed in any order, unless otherwise specified, and that the methods may include more or less aspects or steps than those disclosed herein.

In view of the above, it will be seen that several objects of the invention are achieved and other advantageous results attained.

As various changes could be made in the above exemplary constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A system for detecting a fuel injection closing point associated with a cylinder of a locomotive diesel engine, the system comprising:
    a fuel injection pump solenoid associated with the cylinder of the locomotive diesel engine;
    a fuel injection pump solenoid driver circuit for providing a current and a voltage to a winding of the fuel injection pump solenoid, said fuel injection pump solenoid having a low side driver for selectively supplying a first voltage to a low side of the fuel injection pump solenoid and a high side driver for selectively supplying a second voltage to a high side of the fuel injection pump solenoid;
    a sensor for detecting the current through the winding of the fuel injection pump solenoid;
    a detector responsive to the sensor for detecting a change in a slope of the current as a function of time, said change of slope being from a decrease in current over time to an increase in current over time;
    a processor responsive to the detector and configured with computer instructions stored on a computer readable medium for determining a capacitive charge value as a function of a measurement, operating characteristic or parameter of the engine, said processor electrically coupled to the capacitive charge circuit for providing the capacitive charge to the capacitive charge circuit; and
    a capacitive charge circuit coupled to the fuel injection pump solenoid for modifying the voltage and the current provided by the fuel injection pump solenoid driver circuit as a function of the determined capacitive charge value.

2. The system of claim 1, wherein the capacitive charge circuit conditions a current through the solenoid in response to a current slope parameter, said current slope parameter defining a change in the current after removal of an electrical charge to the solenoid.

3. A method for detecting the closing point of a fuel injection pump solenoid associated with a cylinder of a locomotive diesel engine, the method comprising:
    specifying a detection time period;
    applying an electrical characteristic to the fuel injection pump solenoid associated with the cylinder of the locomotive diesel engine with a fuel injection pump solenoid drive circuit comprising a low side driver for selectively supplying a first voltage to a low side of the fuel injection pump solenoid and a high side driver for selectively supplying a second voltage to a high side of the fuel injection pump solenoid;
    conditioning the electrical characteristic applied to the fuel injection pump solenoid as a function of a measurement, operating characteristic or parameter of the engine by applying a capacitive charge characteristic to the fuel injection pump solenoid, said conditioning changing the current as a function of time;
    detecting a current through the fuel injection pump solenoid during the specified time period;
    determining a current slope, said current slope being the incremental change in
    the current in respect to time;
    detecting a change in the current slope from a negative current slope to a positive current slope; and
    generating a signal in response to detecting the change in the slope.

4. The method of claim 3 wherein said detecting a change in the slope of the current as a function of time is detecting a change in the slope from a negative slope to a positive slope.

5. The method of claim 3 wherein the current is detected prior to an expiration of a detection time period.

6. The method of claim 3 wherein said detection time period corresponds to a closing point detection window, and wherein said closing point detection window is determined as a function of solenoid power supply voltage.

7. The method of claim 6 wherein the closing point is detected when the decaying current slope goes from a steady negative value to a positive value within a closing point window.

8. The method of claim 6 wherein said closing point window is further determined as a function of a cylinder position.

9. The method of claim 6 wherein said closing point window is further determined as a function of an engine operating parameter.

10. The method of claim 9 wherein said operating parameter being from the list: engine speed, cam position, cylinder position, and solenoid cable length.

11. The method of claim 9 wherein the engine operating parameter is determined generally contemporaneous with the determining of the closing point window.

12. The method of claim 6 wherein said determining is a function of a previously determined closing point window.

13. The method of claim 12 wherein determining a closing point window is generally contemporaneous with the determining of the previously determined closing point window.

* * * * *